E. L. DUNN.
ELEVATOR SAFETY CONTROLLING MECHANISM.
APPLICATION FILED FEB. 5, 1910.

1,212,195.

Patented Jan. 16, 1917.
6 SHEETS—SHEET 1.

Witnesses:
Peter A. Roe
A. K. Schneider

Inventor
Edward L. Dunn,
By his Attorneys
Edwards, Sager & Wooster.

E. L. DUNN.
ELEVATOR SAFETY CONTROLLING MECHANISM.
APPLICATION FILED FEB. 5, 1910.

1,212,195.

Patented Jan. 16, 1917.
6 SHEETS—SHEET 4.

UNITED STATES PATENT OFFICE.

EDWARD L. DUNN, OF WORCESTER, MASSACHUSETTS, ASSIGNOR, BY MESNE ASSIGNMENTS, TO STANDARD PLUNGER ELEVATOR COMPANY, OF WORCESTER, MASSACHUSETTS, A CORPORATION OF MASSACHUSETTS.

ELEVATOR SAFETY CONTROLLING MECHANISM.

1,212,195.      Specification of Letters Patent.      Patented Jan. 16, 1917.

Application filed February 5, 1910. Serial No. 542,179.

*To all whom it may concern:*

Be it known that I, EDWARD L. DUNN, a citizen of the United States, residing at Worcester, in the county of Worcester and State of Massachusetts, have invented certain new and useful Improvements in Elevator Safety Controlling Mechanism, of which the following is a full, clear, and exact specification.

This invention relates to speed controlling mechanism for elevators, and has particular reference to automatic mechanism whereby the motor is first automatically slowed down upon reaching a predetermined speed, and then disconnected in case such speed should be exceeded, and upon a further increase in speed, a safety device mounted upon the car applied to check the speed, and stop the car.

Under some conditions, the car may tend to run away, and attain a dangerous speed before the operator is aware of it, which tendency it is one object of this invention to prevent without the necessity of applying the safety device intended to check falls or a runaway. Such safety devices do not ordinarily operate unless the car considerably exceeds the predetermined safe speed, and when operated, require considerable time and trouble to release, even though no fall may have occurred. According to this invention, I propose to provide means for automatically slowing the motor, and then stopping it before the safety device acts, which in many instances will prevent trouble and avoid the delay and inconvenience caused where the safety device alone controls the car. Furthermore, in case the speed of the car should not be checked without the operation of the safety, as in case of a fall, the motor would have been stopped before the safety acted, thereby protecting it from damage by running away.

In order to accomplish the foregoing objects, I provide a governor mechanism for controlling the motor circuits and the car safety device in succession, the governor mechanism and the car safety each having advantageous features which I will describe generally.

In centrifugally controlled safety devices commonly known, the governor is required to positively clamp a rope running with the car and connected to the safety device on the car, in order to actuate the safety device. This is objectionable in that the sudden clamping of the rope may break it, before the clamping jaws have had time to operate, thereby throwing the whole device out of operation when most needed, or stop the car too suddenly. In order to apply the maximum retarding force by the jaws only a certain pull on the rope is necessary, while a greater pull simply tends to break the rope and is without useful stopping effect.

In order to attain the desired pull, I provide a traction hitch governor driving mechanism, in combination with means for automatically stopping the governor driving sheave to apply the necessary tension to the rope to apply the gripping jaws with the maximum pressure. Upon a predetermined tension of the rope being attained by the positive stopping of the sheaves, further movement will cause the rope to slip, while still maintaining the tension and applying the jaws positively and equally by a substantially constant force.

In combination with the rope retarding means, there is mounted on the car an actuating drum having cam and wedge connection with the jaws, whereby the jaws will be quickly applied to the guides and positively held when once applied, even if the rope should break. It is also desirable that the operator should be able to operate the safety stop, and means is provided whereby this can be done, and also the jaws released readily from within the car after having been operated automatically or by hand.

In such apparatus, a most important feature is the governor, which should not be overtaxed by requiring it to move heavy parts, since thereby, its sensitiveness is reduced. According to this invention, the governor at successive speeds, operates two motor controlling switches, and then releases a small clutch which causes the stoppage of the rope. The clutch releases the driving connection of the governor and further movement of the sheave causes it to strike an abutment and stop, the abutment being normally movable, as long as the clutch is in, sufficiently to clear the sheave. These parts are light and easily movable, and the actual stoppage is effected by the movement of the sheave, without overloading the governor.

The invention comprises various other features of novelty and advantage all of which will be more fully pointed out hereinafter in connection with the detailed description of the accompanying drawings, wherein—

Figures 1, 16:
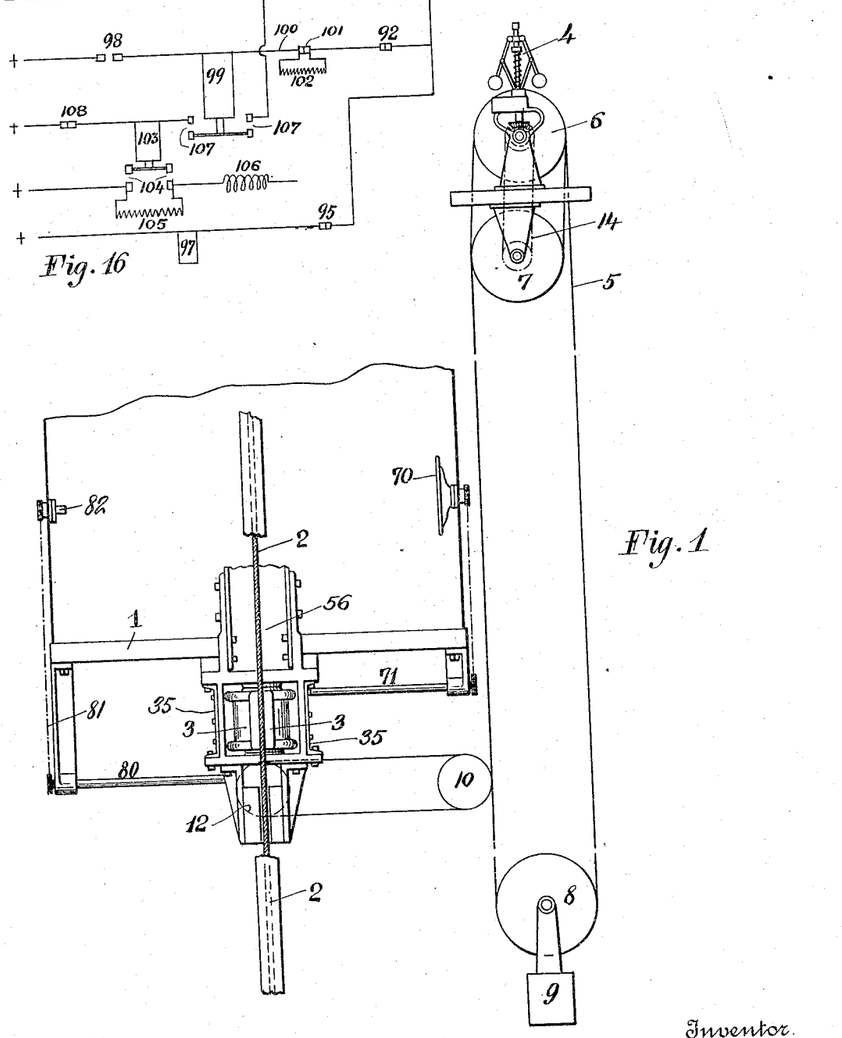
Figure 1 is an elevation of a portion of an elevator system embodying the invention.
Fig. 16 is a diagram of a portion of the electrical connections employed.
Figures 2, 6, 7:
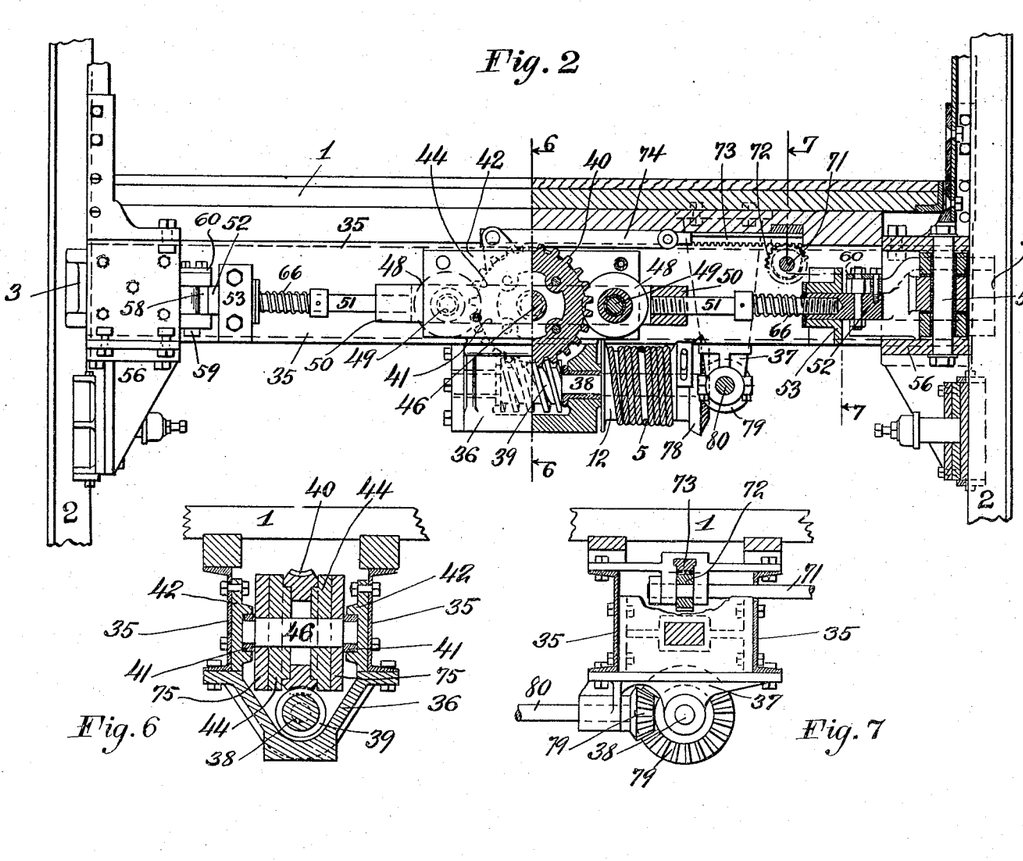
Fig. 2 is an elevation partly in section of the mechanism carried on the car.
Fig. 6 is a section on the line 6, 6 of Fig. 2.
Fig. 7 is a section on the line 7, 7 of Fig. 2.

1 represents a car platform running between guides 2, 2 carrying gripping jaws 3, 3 for frictionally stopping the car when brought into contact with the guides 2, 2. 4 represents a governor driven by a rope 5 running over sheaves 6, 7, preferably located at the top of the hatchway. At the bottom the rope 5 runs around a tension sheave 8 having a weight 9, and in opposite directions around a sheave 10 carried by the car. From the sheave 10 the two ends of the rope are wound in opposite directions so as to give a positive hitch around a drum 12 carried by the car. While the car is running normally, with the jaws 3 held out of contact with the guides 2, the rope 5 runs in a direction corresponding with that of the car around the sheaves 6, 7 and 8 without turning the sheave 10 on the car or drum 12. The manner of running the rope 5 around the sheaves 6 and 7 is shown in detail in Figs. 13 and 14, forming what I will call a traction hitch. It will be seen that the driving force on the governor will depend upon the friction between the wraps of the rope 5 around the sheaves 6 and 7, which are geared together by a sprocket chain 14, and the tension produced by the weight 9. The sheave 6 is loosely mounted on a shaft 16, and carries a driving pin 17 which engages with a movable clutch member 18 splined on the shaft 16 to thereby drive the governor 4 through beveled gears 19, 20 and shaft 21. As the speed of the governor 4 increases the sliding collar 22 will be lifted and at a predetermined speed the clutch 18 will be thrown out through the link 23 and lever 24, thereby stopping the rotation of the shaft 16. Before the clutch 18 is entirely thrown out a link 25, connected to link 23 and lever 24, operates a pair of switches 26 to first automatically slow the motor, as by strengthening its field, and subsequently, in case the speed should still be excessive, to open the controlling circuit and thereby cut off the current from the motor. It is only after these two actions have occurred that the clutch is entirely disengaged and the sheave 6 consequently locked against rotation.

In devices heretofore proposed, where a governor operates gripping jaws on the car at a predetermined speed, the common method has been to cause the governor to stop the rope by cam grips, so as to release springs which actuate the gripping jaws on the car, but this tends to cut the rope, as the rope when sliding through the grip is likely to become crushed and otherwise damaged. In some instances the rope or the grip has broken and thereby rendered the jaw operating mechanism inoperative. Experience with a traction hitch has shown that its holding power is equal to the tension weight, and that the maximum pull on the rope can be regulated by the tension weight. This feature is very desirable and important for the reason that the rope can be made to slip at any predetermined tension without the use of springs or other uncertain methods of adjustments. Experience has shown that with proper design of parts and multiplying connections, a pull on the rope of say 500 lbs. can be multiplied to give a stopping pressure on the jaws of as much as 125,000 lbs., or 2500 lbs. per square inch, and that greater tension on the rope simply strains the rope without producing effective additional stopping pressure. According to this feature of the invention, by providing a traction hitch the predetermined jaw actuating pressure can be applied to the rope by automatically stopping the sheaves over which the rope runs until the desired pressure at the jaws is obtained, and thereafter permitting the rope to slide over the stationary sheaves, thereby the rope is not strained to the breaking point and a substantially constant actuating force is applied to the jaws without danger of breaking the rope. This permits the use of positive connections between the rope drum on the car and the gripping jaws, without depending upon springs, latches, and other more or less unreliable devices.

Figures 13, 14, 15, 17:
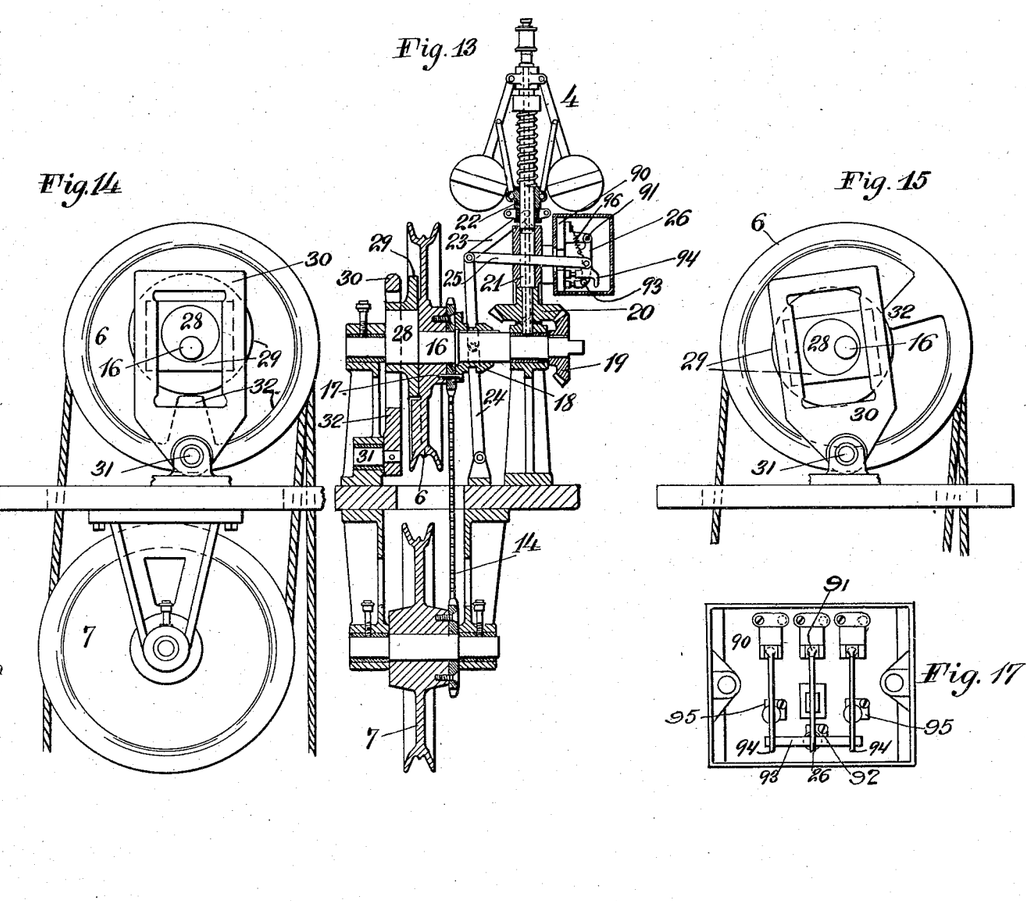
Fig. 13 is a detail elevation partly in section of the governor mechanism.
Fig. 14 is a side elevation.
Fig. 15 is a detail view showing the manner of stopping the governor sheave.
Fig. 17 is a plan view of the governor operated switches.

The shaft 16 is provided with an eccentric 28, which is mounted in a circular block 29, having a second portion sliding in an oscillatory frame 30 pivoted at 31. On the sheave 6 is a lug 32 which just clears the circular edge of block 29 as it is moved harmonically by the eccentric 28. When the clutch 18 is thrown out, oscillation of the circular cam block 29 stops, and it no longer clears the arc in which the lug 32 moves. The lug 32 thus overtakes and wedges against the circular surface of block 29, as shown in Fig. 15, and the sheaves 6 and 7 therefore are positively stopped as soon as the clutch disengages. The stopping of the sheaves of course puts tension on the rope, as the rope stops until sufficient tension is put thereon to cause it to slip, and the tension remains substantially constant irrespective of the speed of the car, since the tension will remain even after the rope slips around the sheaves 6 and 7. It is thus perfectly safe to use this tension applied by stopping the sheaves, (which tension can be predetermined to any desired amount) for turning the drum on the car and thereby positively applying the jaws. With a rope having a tensile strength of six thousand pounds, and subjected to an approximately maximum pull of say five hundred pounds, it will be seen that an ample margin of safety will be attained. Even in case the rope should break after having applied the jaws, they would remain applied in this invention, on account of the non-reversing actuating connections employed.

Figures 3, 8:
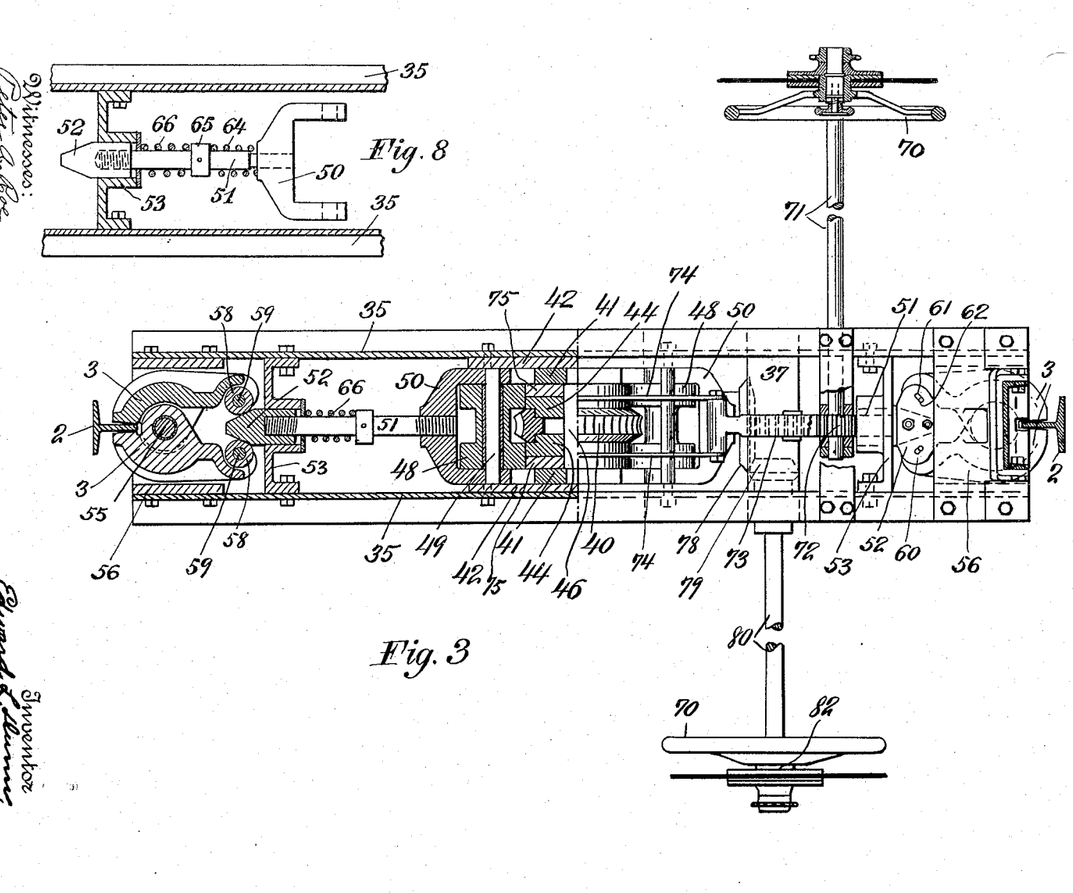
Fig. 3 is a plan view, partially in section.
Fig. 8 is a detail view showing one of the wedges and its mounting, together with a slight modification.
Figure 4:
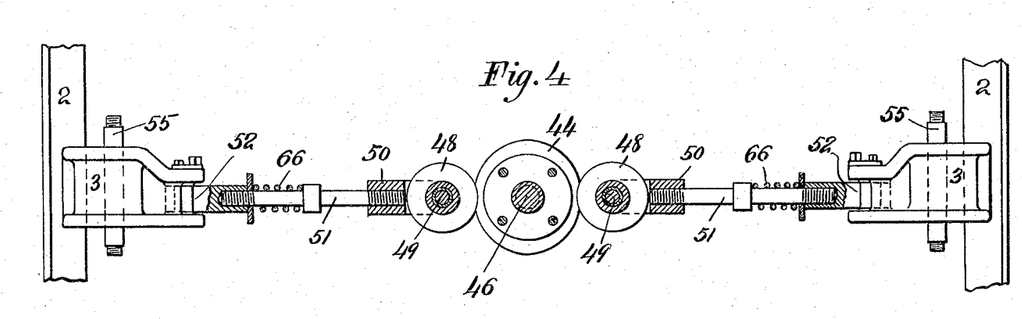
Fig. 4 is a detail view showing the gripping jaws and automatic cam actuating mechanism.
Figure 5:
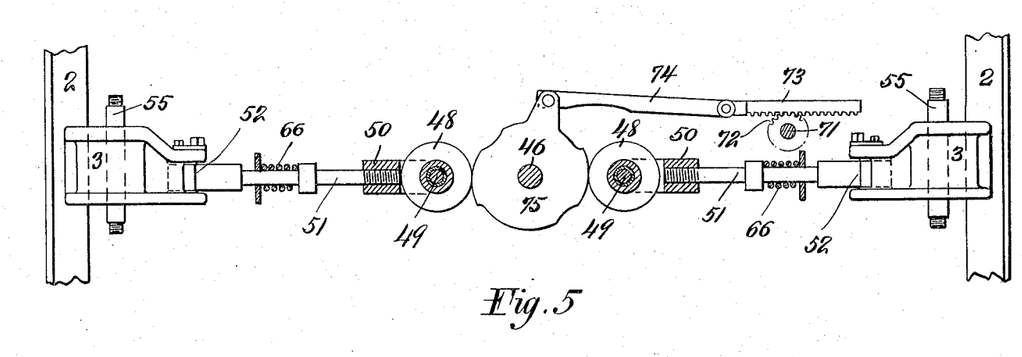
Fig. 5 is a similar view showing the hand actuating mechanism.
Figures 9, 10, 11, 12:
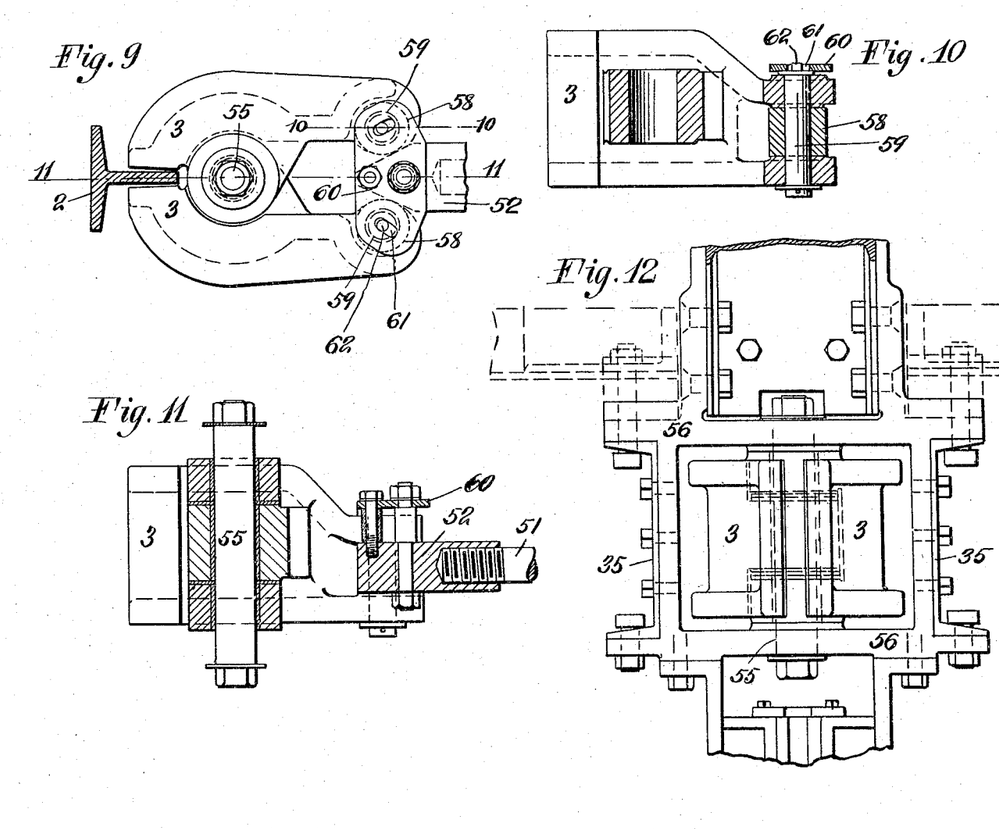
Fig. 9 is a plan view showing one of the pairs of jaws.
Fig. 10 is a section thereof on the line 10, 10 of Fig. 9.
Fig. 11 is a section on the line 11, 11 of Fig. 9.
Fig. 12 is a detail end elevation on a large scale.

Referring now to Figs. 2 to 8, inclusive, the mechanism on the car for applying the jaws will now be described. The entire mechanism is carried between two channels 35, 35, bolted to the frame of the car. The drum 12 is carried at one end by a casing 36, and at the other by a hanger 37. 38 is a shaft on which the drum 12 is mounted and having within the casing 36 a worm 39 which meshes with a worm gear 40 journaled in sliding blocks 41, carried in grooved blocks 42, secured to the beams 35. Securely bolted to the worm gear 40 on opposite sides, are a pair of cams 44, shown in detail in Fig. 4, and also seen in Figs. 2, 3 and 6. These cams rotate loosely on a stud 46, which is journaled in the sliding blocks 41. Fig. 4 shows the outline of the cams 44, it being observed that these cams have notches diametrically opposite the low points in which normally rest rollers 48, one on each side. As soon as the gear turns in either direction, the first effect will be to move the rollers with a large movement, which is for the purpose of taking up the slack and bringing the jaws into contact with the guides, while further rotation of the cams applies the jaws with constantly increasing pressure. Rollers 48 are double, as shown in Fig. 3, and are mounted on studs 49 carried in yokes 50, the yokes sliding in the grooved blocks 42. Carried by each yoke 50 is a heavy rod 51, which carries at its front end a wedge 52, the latter sliding in a guide block 53, firmly secured on the end frames 35, and operating the gripping jaws 3. The jaws 3 cross each other and are pivoted on heavy vertical studs 55 carried in heavy end castings 56, Fig. 12, rigidly carried by the car frame. Each jaw carries a roller 58 mounted on a stud 59, which rollers are engaged by the wedge 52. The wedge 52 carries a plate 60 having cam slots 61 which engage pins 62 on the jaws 3, so that when the wedge is withdrawn the jaws will be separated, and held separated, thereby preventing wear during the normal running of the car.

An important feature of an elevator safety of the jaw type is that the pressures on the opposite guide rails must be equalized, since cars have been known to collapse because the pressure on one side was greater than on the other. In this invention, the gear 40, by reason of being mounted in a floating bearing block 41, will simply roll on the worm until the pressures are exactly equal, and thereafter when the worm is turned will rotate on its own axis to turn the cams and apply the jaws. When the rope is stopped by the governor mechanism above described, the drum 12 will be turned, the rope winding off one side as it winds on the other. It will also be seen that the worm 39, by reason of being in casing 36 can be readily kept lubricated and will also lubricate the worm gear 40, which is a desirable feature, as in some of the devices heretofore devised difficulties have arisen in lubricating the parts subject only to occasional use and sometimes failing when wanted because of not having been lubricated properly.

In Fig. 8 a slight modification is shown, in that the yoke 50 slides on rod 51 and first compresses a spring 64 between it and a collar 65 to move the wedge 52. After the yoke 50 has moved a certain distance it strikes a shoulder on rod 51 and thereafter moves it directly. 66 is a similar spring used in both forms for withdrawing the wedges 52 from between the rolls 58 and thereby causing the cam plates 60 to open the jaws.

It is desirable to provide means for setting a safety manually, from within the car, and this is provided for by means of the hand wheel 70 geared to shaft 71 running under the car and carrying a gear 72 which meshes with a rack 73 connected by a link 74 to a cam 75 (see Fig. 5) which actuates the rollers 48 and succeeding parts in the same manner as before described. Cams 75 are loosely mounted on stud 46 (Fig. 6) and equalize in the same manner as the cams 44, the gear 40 in this case rolling idly on the worm 39. To release this form, the hand wheel is simply turned backward by the operator. When, however, the jaws are applied by the turning of the drum 12, it is desirable to provide resetting means operable from within the car, and this I have accomplished by means of beveled gears 78, 79, shaft 80 and sprocket chain 81 connected to a short shaft 82 extending into the car. This shaft 82 is fitted to receive the hand wheel 70, which is detachable from its shaft when the drum 12 is to be turned back to release the jaws. When the governor has locked, it is released by applying a wrench to the squared end of shaft 16. The jaws 3 can also be set by turning the drum through the hand wheel when on shaft 82 in either direction, but the other means is quicker.

The advantages of the foregoing construction consist principally in the rolling cam actuating motion for the jaws, which is extremely positive and not open to the objection of difficult lubrication, and also by reason of the differential cam which first takes up the slack of the jaws quickly, while the car moves a short distance and then applies the gripping pressure steadily but more gradually. Also an important advantage is that one rope running with the car, operates the safety and the governor controlled switches, by turning the drum and the cams in either direction. With devices heretofore commonly used there is a rope running with the car in either direction, and attached to this rope is a second rope which is wound around a screw drum which can only be turned in one direction, as movement in the other direction would release the jaws, and this invention is also non-releasing in case of breakage of the rope in either direction. The motor switch mechanism and wiring diagram, so far as is necessary to understand this invention, are shown in Figs. 13, 16 and 17. The link 25, before described as connected to be operated by the governor, is pivoted to switch blade 26, which latter is pivoted to a base 90 at 91 and opens and closes a single pole switch 92. After blade 26 has opened single pole switch 92, a transverse rod 93 carried thereby strikes arms 94 of two switches 95, which are so connected to form a double pole switch and are opened simultaneously by the rod 93 on switch arm 26.

96 are springs for normally holding all of the switches closed.

Referring to Fig. 16, 97 is a magnet on the main switch for holding it closed, and is connected to be controlled in the well known manner. Ordinarily, there are two main switch magnets, one for up and one for down, but only one, as 97, is shown herein. At the same time that magnet 97 closes the main switch, contacts 98 are also closed, thus energizing magnet 99 connected in a wire 100 leading to contacts 101 and through switch 92. Across contacts 101 is a high resistance 102. 103 represents a magnet controlling contacts 104 across which is connected the shunt field resistance 105, the contacts 104 being also in the circuit of the shunt field 106. The switch 98 is closed by the main switch thereby energizing magnet 99 and closing the circuit of magnet 103 at contacts 107, contacts 108 in the circuit of magnet 103 having been closed by the moving of the controller to the highest speed position. This thereby energizes magnet 103 and throws resistance 105 into the shunt field circuit, thereby weakening the field and speeding up the motor. The contacts 101 are mechanically opened by the rheostat when it has moved to cut out all of the armature resistances, so that the current through magnet 99, high resistance 102 and governor switch 92 is only sufficient to hold switch 107 closed and thereby energize magnet 103 to open switch 104. In case the motor speeds up so that the governor opens switch 92, it will be seen that magnet 99 lets go, thereby opening switch 107 and closing switch 104 to short-circuit the shunt field resistance 105, thus strengthening the field of the motor. In case this should be sufficient to slow the motor down, switch 92 would again close, but the current through high resistance 102 would not be sufficient to energize magnet 99 to close switch 107, so that the motor would run to the end of the travel, or to the next stop with the strong field. Upon the stopping of the motor by the controller, the parts would all be returned to their original positions ready to act again, when necessary. If the strengthening of the field does not sufficiently slow the motor, further movement of the governor would open switch 95, and thereby open the main switch by deënergizing main switch magnet 97, cutting off all current from the motor. This would stop the car going up or down except in case of breakage of the rope. In the latter case, the governor would speed up and throw out the clutch 18, as before described, and apply the gripping jaws to the guides.

It will therefore be seen that I have provided an elevator safety mechanism wherein a centrifugal governor controls the speed by first automatically slowing the motor and then by stopping it, and lastly by stopping the car through the gripping jaws by positive and direct acting connections through a single rope. The specific construction and details herein illustrated may of course be varied without departing from the scope of the invention.

Having thus described my invention, I declare that what I claim as new and desire to secure by Letters Patent, is—

1. The combination in an elevator safety device with a car, retarding means, of a rope running with the car connected to actuate said retarding means, a governor, a plurality of traction wheels around which the rope runs for driving said governor, and means controlled by the governor for exerting a wedging action on one of said wheels whereby at a predetermined speed one of the wheels is automatically stopped, and said retarding means is operated by said rope.

2. The combination in an elevator safety device, with a car and guides, of gripping jaws, a drum carried by the car, a rope running with the car and connected to rotate said drum, connections between said drum and said jaws whereby rotation of said drum in either direction applies the jaws to said guides, a driving sheave, a governor driven by said rope through said sheave, and means for stopping the governor driving sheave at a predetermined speed of the governor to cause operation of the jaws by continued tension of the rope.

3. The combination in an elevator safety device, with a car and guides, of gripping jaws, a drum carried by the car, a rope running with the car, and connected to rotate said drum, cam connections between said drum and said jaws whereby rotation of said drum in either direction applies the jaws, a governor driven by said rope, means for disconnecting the governor at a predetermined speed, and means effective to stop the rope upon disconnection of the governor.

4. The combination in an elevator safety device, with a car and guides, of gripping jaws, a drum carried by the car, a rope running with the car, and connected to rotate said drum, worm gear and cam connections between said drum and said jaws whereby rotation of said drum in either direction applies the jaws, a governor driven by said rope, means for disconnecting the governor at a predetermined speed, and means effective to stop the rope upon disconnection of the governor.

5. The combination in an elevator safety device, with a car and guides, of gripping jaws, a drum carried by the car, a rope running with the car and connected to rotate said drum, worm gear and rotatable cam connections between said drum and said jaws, a governor driven by said rope, and means controlled by the governor for stopping the rope and actuating said jaws.

6. The combination in an elevator safety device with a car and guides, of pivoted gripping jaws, sliding wedges for applying said jaws, rotatable cams for sliding said wedges, a worm gear for turning said cams, a worm, a drum for turning said worm, a rope around said drum and running with the car, and means for automatically stopping said rope at a predetermined speed to operate said jaws.

7. The combination in an elevator safety device with a car and guides, of pivoted gripping jaws, sliding wedges for spreading said jaws, rotatable cams for sliding said wedges, a worm gear for turning said cams, a worm, a drum for turning said worm, a rope around said drum and running with the car, means for automatically stopping said rope at a predetermined speed to operate said jaws, and means whereby the rope slips when a predetermined tension thereon is reached.

8. The combination in an elevator safety device, with a car, having retarding devices and an actuating drum, of a rope on said drum and running with the car, a plurality of intergeared traction wheels driven by the rope, an automatically released friction device for stopping the rotation of said traction wheels to operate said retarding devices by said rope, the traction between said rope and said wheels being predetermined to permit the rope to slip before the breaking limit of the rope is reached.

9. The combination in an elevator safety device, with a car, having a plurality of gripping devices, actuating means, equalizing means, and an operating drum, of a rope on said drum and running with the car, a plurality of intergeared traction wheels driven by the rope, an automatically released friction device for stopping the rotation of said traction wheels to operate said retarding devices by said rope, the traction between said rope and said wheels being predetermined to permit the rope to slip before the breaking limit of the rope is reached.

10. The combination in an elevator safety device, with a car, of a plurality of gripping devices, wedges for actuating said gripping devices, means including a drum for actuating said wedges to exert an equal pressure, a rope on said drum and running with the car, a plurality of intergeared traction wheels driven by the rope, an automatically released friction device for stopping the rotation of said traction wheels to operate said retarding devices by said rope, the traction between said rope and said wheels being predetermined to permit the rope to slip before the breaking limit of the rope is reached.

11. The combination in an elevator safety device with a plurality of retarding devices, of floating cam and worm gear means for simultaneously applying with equal pressure said retarding devices, and automatically controlled rope actuating means including a plurality of intergeared traction wheels for applying a predetermined substantially constant force to said retarding devices.

12. The combination in an elevator safety device with opposite retarding devices, of a rotatable cam between said devices for simultaneously applying retarding force when turned in either direction, means for equalizing the retarding force, and means for turning the cam.

13. The combination in an elevator safety device with opposite retarding devices, of a rotatable cam between said devices for simultaneously applying retarding force when turned in either direction, means for equalizing the retarding force, and centrifugally controlled means for turning the cam.

14. The combination in an elevator safety device with opposite retarding devices, of a cam between said devices for simultaneously applying retarding force when turned in either direction, a worm and gear for actuating said cam, said gear being bodily movable with the cam whereby to equalize the actuating force, a drum for actuating said worm, a rope running with the car and wound around said drum for operating said retarding devices, and means for exerting a tension on the rope when running in either direction to apply said retarding devices.

15. In a governor controlled elevator safety device, the combination with a car and a safety rope running with the car, of a sheave driven by said rope, a governor driven by said sheave, a releasable clutch between said sheave and said governor and controlled thereby to disconnect the sheave at a predetermined speed, and a wedge moving with the sheave when the clutch is closed, said wedge blocking the sheave against rotation when the clutch is released.

16. In a governor controlled elevator safety device, the combination with a car and a safety rope running with the car, of a sheave driven by said rope, a governor driven by said sheave, a releasable clutch between said sheave and governor, connections between said governor and clutch effective to disconnect the governor at a predetermined speed, and means whereby upon disconnection of the governor the rope actuates the safety device to stop the car.

17. In an elevator safety device, the combination with a car having safety devices, of a rope running with the car and controlling said safety devices, a governor driven by said rope, and means controlled by the governor at a predetermined speed for releasing its driving connection and applying the safety devices.

18. In an elevator safety device, the combination with a car having safety devices, of a rope running with the car and controlling said safety devices, a governor driven by said rope, means controlled by the governor at a predetermined speed for releasing its driving connection, and frictional means effective upon release of said driving connection for retarding said rope and applying the safety devices.

19. In an elevator safety device, the combination with a car having safety devices, of a rope running with the car and controlling said safety devices, including a plurality of intergeared traction wheels, a governor, and means controlled by the governor at a predetermined speed for frictionally retarding said rope until a predetermined tension is applied for applying said safety devices.

20. The combination with oppositely disposed retarding devices, of a pair of bodily movable actuating wedges, a worm, actuating means therefor, a gear, and a cam turned by said gear for actuating said wedges, said gear and cam being bodily movable relatively to said worm whereby to equalize the force applied to said retarding devices.

21. The combination in an elevator safety device with rope controlled retarding devices, of means for actuating said retarding devices, a rope connected to said actuating means and running with the car, a sheave and a governor driven by said rope, a shaft driven by said sheave, a clutch controlled by said governor for disconnecting the shaft at a predetermined speed, and an abutment carried by the shaft for positively stopping the sheave when disconnected.

22. The combination in an elevator safety device with rope controlled retarding devices, and centrifugally controlled means for applying said retarding devices, of a rope running with the car and causing application of said retarding devices when stopped, and rope stopping means comprising a sheave, a governor, a clutch controlled by the governor for disconnecting the sheave, and an abutment normally moving with the sheave but when disconnected positively stopping said sheave.

23. The combination in an elevator safety device with rope controlled retarding devices, and centrifugally controlled means for retarding said rope to apply said devices, of a plurality of sheaves geared together and driven by said rope, an abutment releasably connected to be driven with said sheaves, a governor, a clutch controlled by said governor to be released at a predetermined speed, and means whereby said abutment stops said sheaves upon release of said clutch.

24. The combination with a car carrying retarding devices, of a plurality of double cams mounted on said car for applying said retarding devices, manual means for actuating one of said cams to apply said retarding devices, and centrifugally controlled means for automatically actuating said other cam to apply said retarding devices.

25. The combination in an elevator safety device with oppositely disposed retarding devices, of a rotatable notched cam interposed between said devices, said devices normally engaging in said notches and being operated when said cam moves in either direction, and means permitting bodily equalizing movement of said cam.

In testimony whereof I affix my signature, in presence of two witnesses.

EDWARD L. DUNN.

Witnesses:
C. FORREST WESSON,
E. M. ALLEN.

Copies of this patent may be obtained for five cents each, by addressing the "Commissioner of Patents, Washington, D. C."